US008876643B2

(12) United States Patent
Fickel et al.

(10) Patent No.: US 8,876,643 B2
(45) Date of Patent: Nov. 4, 2014

(54) DEVICE FOR DRIVING A VEHICLE

(75) Inventors: Frank Fickel, Uetze (DE); Jens Liebold, Chemnitz (DE); Erik Schneider, Rossau (DE)

(73) Assignee: IAV GmbH Ingenieurgesellschaft Auto und Verkehr, Berlin (DE)

( * ) Notice: Subject to any disclaimer, the term of this patent is extended or adjusted under 35 U.S.C. 154(b) by 156 days.

(21) Appl. No.: 13/519,341

(22) PCT Filed: Jan. 7, 2011

(86) PCT No.: PCT/DE2011/000016
§ 371 (c)(1),
(2), (4) Date: Jun. 27, 2012

(87) PCT Pub. No.: WO2011/082707
PCT Pub. Date: Jul. 14, 2011

(65) Prior Publication Data
US 2012/0295750 A1 Nov. 22, 2012

(30) Foreign Application Priority Data

Jan. 9, 2010 (DE) .......................... 10 2010 004 228

(51) Int. Cl.
| F16H 3/72 | (2006.01) |
| F16H 37/06 | (2006.01) |
| F16H 48/06 | (2006.01) |
| B60K 6/445 | (2007.10) |
| F16H 3/54 | (2006.01) |
| F16H 48/08 | (2006.01) |
| B60K 1/00 | (2006.01) |

(52) U.S. Cl.
CPC ........ *F16H 3/54* (2013.01); *F16H 48/08* (2013.01); *B60K 2001/001* (2013.01); *F16H 2200/0021* (2013.01)
USPC .... 475/5; 475/4; 475/9; 475/149; 180/65.235

(58) Field of Classification Search
USPC .................................... 475/1–10; 180/65.235
See application file for complete search history.

(56) References Cited

U.S. PATENT DOCUMENTS

| 4,418,777 A | * | 12/1983 | Stockton ...................... 180/65.6 |
| 4,702,125 A | * | 10/1987 | Kalns ............................ 475/205 |

(Continued)

FOREIGN PATENT DOCUMENTS

| DE | 4300445 A1 | 7/1994 |
| DE | 10211193 A1 | 9/2003 |

(Continued)

OTHER PUBLICATIONS

European Patent Office, International Search Report in International Patent Application No. PCT/DE2011/000016 (May 16, 2011).

*Primary Examiner* — Tisha Lewis
(74) *Attorney, Agent, or Firm* — Leydig, Voit & Mayer, Ltd.

(57) ABSTRACT

A device for driving a vehicle includes a housing, an electric motor, a differential gear unit, and a planetary gear unit. The planetary gear unit includes a sun gear connected to the electric motor, a ring gear coupleable via a first coupling to the housing, a plurality of planetary gears disposed between the ring gear and the sun gear and mounted on a planet carrier coupled to the differential gear unit, the planet carrier coupleable to the ring gear by a second coupling, the second coupling being disposed in a plane with the first coupling parallel to the electric motor.

4 Claims, 2 Drawing Sheets

(56) References Cited

U.S. PATENT DOCUMENTS

| | | | |
|---|---|---|---|
| 4,799,158 A * | 1/1989 | Patil | 701/59 |
| 5,620,387 A | 4/1997 | Janiszewski | |
| 5,751,081 A | 5/1998 | Morikawa | |
| 7,247,117 B2 | 7/2007 | Forster | |
| 8,475,311 B2 * | 7/2013 | Ren et al. | 475/5 |
| 2005/0124451 A1 | 6/2005 | Morikawa | |
| 2006/0223670 A1 | 10/2006 | Nishikawa et al. | |
| 2007/0023211 A1 | 2/2007 | Keller et al. | |
| 2008/0167153 A1 * | 7/2008 | Bachmann | 475/9 |
| 2009/0211824 A1 | 8/2009 | Knoblauch et al. | |
| 2014/0129067 A1 * | 5/2014 | Furukawa et al. | 701/22 |

FOREIGN PATENT DOCUMENTS

| | | |
|---|---|---|
| DE | 102004026039 A1 | 12/2005 |
| EP | 0760549 A1 | 3/1997 |
| GB | 1448507 A | 9/1976 |
| JP | 2000035092 A | 2/2000 |
| WO | 2007110204 A1 | 10/2007 |
| WO | 2008034520 A1 | 3/2008 |

* cited by examiner

DEVICE FOR DRIVING A VEHICLE

CROSS REFERENCE TO PRIOR APPLICATIONS

This application is a U.S. National Phase application under 35 U.S.C. §371 of International Application No. PCT/DE2011/000016, filed on Jan. 7, 2011, and claims benefit to German Patent Application No. DE 10 2010 004 228.5, filed on Jan. 9, 2010. The International Application was published in German on Jul. 14, 2011 as WO 2011/082707 under PCT Article 21(2).

FIELD

The present invention relates to a device for driving a vehicle.

BACKGROUND

A drive axle of a vehicle comprising an electric motor, a differential gear unit and a planetary gear unit is described in DE102004026039A1. The electric motor can be brought into a drive connection with the differential gear unit by means of a coupling apparatus which is operatively connected to the planetary gear unit. The planetary gear unit comprises an input-side sun gear which is connected to a drive shaft of the electric motor, a ring gear, and planetary gears which are disposed radially between the sun gear and the ring gear, mounted on a planet carrier and engaged with the sun gear and an inner tooth system of the ring gear, the planet carrier being coupled to the differential gear unit and it being possible, by means of the coupling apparatus, to fix or release the ring gear relative to a component which is fixed to the housing. When the ring gear is stationary in relation to the component which is fixed to the housing, the differential gear unit and thus the vehicle are driven, the rotational speed of the electric motor being reduced by the reduction gear unit. If the ring gear is released, the rotating drive shaft of the electric motor sets the ring gear in rotation and the differential gear unit and thus the vehicle are not driven. Thus, only one gear ratio is available for driving the vehicle. It is also disadvantageous that this device requires a lot of space owing to the arrangement of the electric motor, the planetary gear unit and the differential gear unit in series in the axial direction, and thus is not very compact.

SUMMARY OF THE INVENTION

In an embodiment, the present invention provides a device for driving a vehicle. The device includes a housing, an electric motor, a differential gear unit, and a planetary gear unit. The planetary gear unit includes a sun gear connected to the electric motor, a ring gear coupleable via a first clutch to the housing, a plurality of planetary gears disposed between the ring gear and the sun gear and mounted on a planet carrier coupled to the differential gear unit, the planet carrier coupleable to the ring gear by a second clutch, the second clutch being disposed in a plane with the first clutch parallel to the electric motor.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

In an embodiment, the present invention provides for optimising the gear ratios and dimensions of this device for driving a vehicle.

According to an embodiment of the invention, this device comprises a housing, an electric motor, a differential gear unit and a planetary gear unit, wherein the sun gear of the planetary gear unit is connected to the electric motor, wherein the ring gear may or may not be connected via a first clutch to the housing, wherein planetary gears are disposed between the ring gear and the sun gear, wherein the planetary gears are mounted on a planet carrier, wherein the planet carrier is coupled to the differential gear unit, and wherein the planet carrier may or may not be connected by a second clutch to the ring gear. According to the invention, an additional gear ratio for driving a vehicle is advantageously provided by means of the second clutch. According to the invention, this second clutch is preferably disposed in a compact manner in a plane with the first clutch, parallel to the electric motor. Another advantage according to the invention is that it is possible to switch between the two gear ratios almost without interrupting the tensile force, by opening one clutch and closing the other. In an advantageous configuration of the present invention, the differential gear unit is disposed coaxially with the electric motor in such a way that the electric motor spatially encompasses the differential gear unit. In other words, in this configuration the differential gear unit is disposed inside the electric motor.

Figure 1:
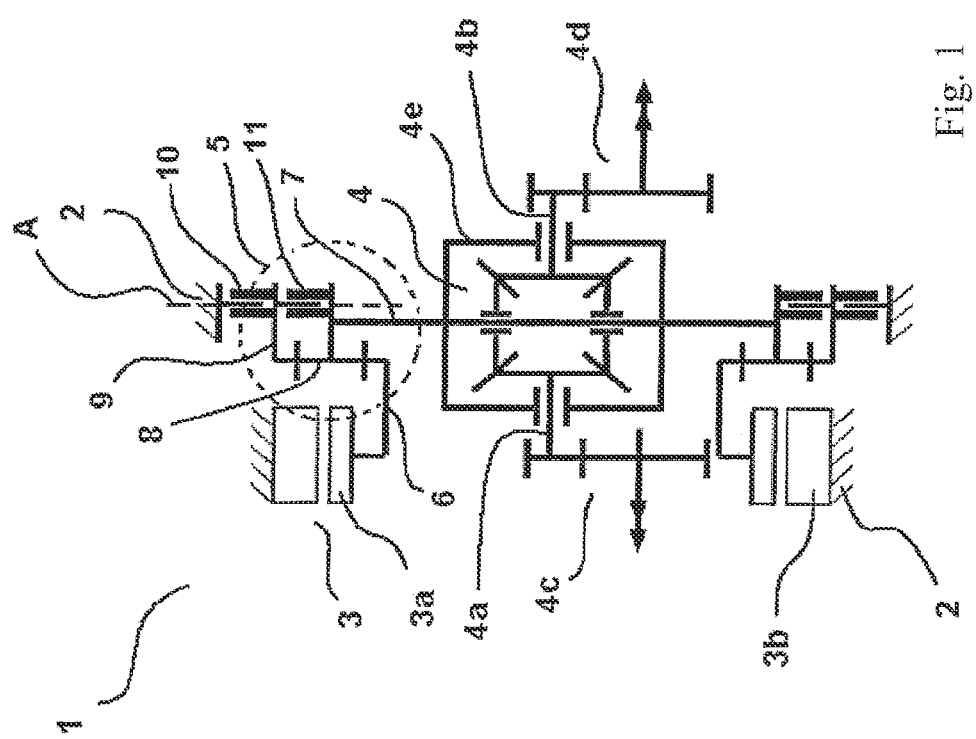
FIG. 1 is a schematic view of a first configuration of an embodiment of the invention.
Figure 2:
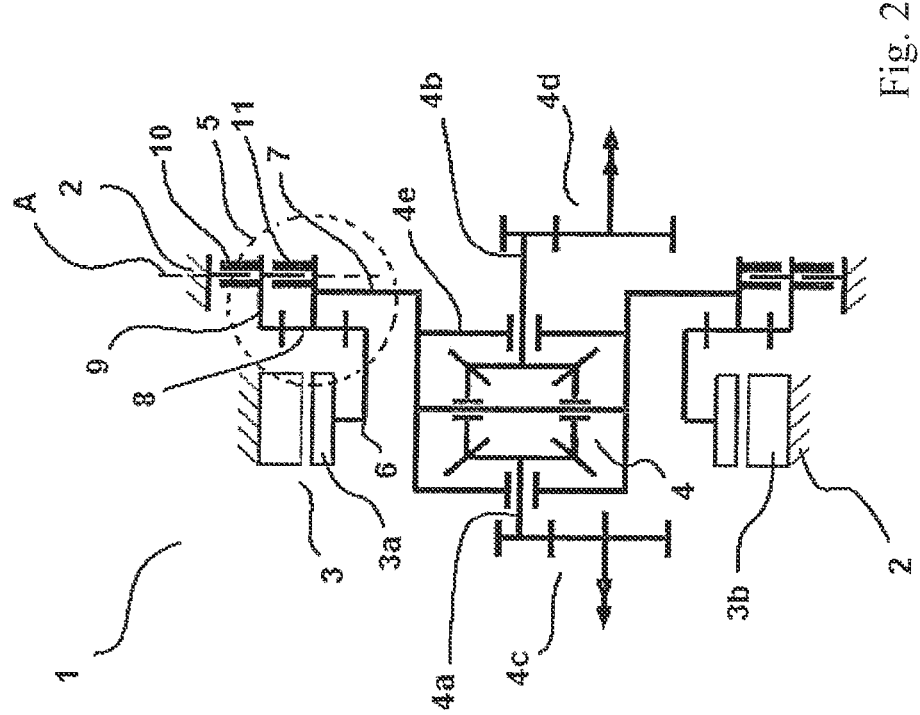
FIG. 2 is a schematic view of another configuration of an embodiment of the invention.

Devices for driving vehicles may be assigned to one axle or to a plurality of axles of the vehicle. In particular, electric motors for driving the vehicle may be assigned to one axle. For example, an internal combustion engine for driving the vehicle may be assigned to the remaining axle, such that the vehicle can be driven mutually independently by one axle or by the two axles together. According to FIG. 1, the invention proposes a device 1 for driving a vehicle, which device comprises a housing 2, an electric motor 3, a differential gear unit 4 and a planetary gear unit 5. The electric motor 3 comprises a rotor 3a and a stator 3b. The differential gear unit 4 is designed as a bevel differential gear unit, but can also be designed differently. Two drive shafts 4a and 4b are guided from the differential gear unit 4 and transmit the rotational movement or the torque from the electric motor 3 for driving the vehicle to the drive wheels via respective reduction stages 4c and 4d. The planetary gear unit 5 comprises a sun gear 6 which is connected to the rotor 3a of the electric motor 3. The planetary gear 5 further comprises a planet carrier 7 which is connected to the differential gear unit 4 and in particular to the differential cage 4e in order to transmit the rotational movement of the planet carrier 7 to the differential gear unit 4. The planet carrier 5 further comprises planetary gears 8 which are disposed or mounted on the planet carrier 7 and engaged with the sun gear 6 and a ring gear 9, as a further component of the planetary gear unit 5. The ring gear 9 can be connected to the housing 2 by means of a clutch 10 and can be released from the housing 2 via the clutch 10, such that said ring gear can rotate freely. According to the invention, the planet carrier 7 also comprises a clutch 11 which in turn can be connected to the ring gear 9 or separated from the ring gear 9. In an advantageously compact manner, the two clutches 10 and 11 are disposed in a plane A, as indicated in FIG. 1 by the dashed line, parallel to the electric motor 3. According to the invention, a vehicle is driven by the device 1 in the following manner. The electric motor 3 or the rotor 3a performs a rotational movement which is transmitted via the sun gear 6 to the planetary gears 8. Assuming that only the clutch 10 is closed and the ring gear 9 is connected to the housing 2 and the clutch 11 is open, such that the planet carrier 7 can rotate independently of the ring gear 9, then the rotational movement of the rotor 3a is transmitted via the sun gear 6 to the planetary gears 8, which in turn are supported on the stationary ring gear 9 and thus transmit the rotational movement to the planet carrier 7 and the differential gear unit 4, this rotational movement in turn being conveyed via the drive shafts 4a and 4b and the reduction stages 4c and 4d to the drive wheels in order to drive the vehicle. In order then, according to the invention, advantageously to provide an additional reduction stage for driving a vehicle, the clutch 10 is opened, that is to say separated from the housing 2, such that the ring gear 9 can rotate freely, and the clutch 11 is closed, such that the planet carrier 7 and the ring gear 9 are interconnected. Since the clutch 11 is closed and the clutch 10 is open, the planetary gears 8, the planet carrier 7, the ring gear 9 and the sun gear 6 form a unit which rotates together. The electric motor 3 or the rotor 3a then exerts a rotational movement on this unit, this rotational movement being conveyed in turn via the drive shafts 4a and 4b and the reduction stages 4c and 4d to the drive wheels in order to drive the vehicle. By means of the device 1 according to the invention, the entire axle to which this device is assigned can also be disconnected by opening the two clutches 10 and 11, such that the vehicle can coast, for example to save fuel, or the electric motor 3 can be uncoupled in the event of damage, or the vehicle can be driven via another axle, for example by means of an internal combustion engine. In an advantageous configuration of the present invention, the differential gear unit 4 is disposed coaxially with the electric motor 3 in such a way that the electric motor 3 spatially encompasses the differential gear unit 4, as shown in FIG. 2. The electric motor 3 can in principle be designed as an external or internal rotor motor.

While the invention has been described with reference to particular embodiments thereof, it will be understood by those having ordinary skill the art that various changes may be made therein without departing from the scope and spirit of the invention. Further, the present invention is not limited to the embodiments described herein; reference should be had to the appended claims.

LIST OF REFERENCE NUMERALS 1 device for driving a vehicle
2 housing
3 electric motor
3a rotor
3b stator
4 differential gear unit
4a drive shaft
4b drive shaft
4c reduction stage
4d reduction stage
4e differential cage
5 planetary gear unit
6 sun gear
7 planet carrier
8 planetary gear
9 ring gear
10 clutch
11 clutch
A plane

The invention claimed is:

1. A device for driving a vehicle comprising:
a housing;
an electric motor;
a differential gear unit; and
a planetary gear unit including a sun gear connected to the electric motor, a ring gear couplable via a first clutch to the housing, a plurality of planetary gears disposed between the ring gear and the sun gear and mounted on a planet carrier coupled to the differential gear unit, the planet carrier being couplable to the ring gear by a second clutch, the second clutch being disposed in a plane with the first clutch parallel to the electric motor.

2. The device as recited in claim 1, wherein the differential gear unit is disposed coaxially with the electric motor such that the electric motor spacially encompasses the differential gear unit.

3. A device for driving a vehicle comprising:
a housing;
an electric motor including an internal rotor motor;
a differential gear unit; and
a planetary gear unit including a sun gear connected to the electric motor, a ring gear couplable via a first clutch to the housing, a plurality of planetary gears disposed between the ring gear and the sun gear and mounted on a planet carrier coupled to the differential gear unit, the planet carrier being couplable to the ring gear by a second clutch, the differential gear unit being disposed coaxially with the electric motor such that the electric motor spacially encompasses the differential gear unit.

4. The device as recited in claim 3, wherein the second clutch is disposed in a plane with the first clutch parallel to the electric motor.

* * * * *